(12) United States Patent
Sakamaki et al.

(10) Patent No.: US 9,016,699 B2
(45) Date of Patent: Apr. 28, 2015

(54) CHUCK DEVICE

(75) Inventors: Kazuo Sakamaki, Ojiya (JP); Akira Sakamaki, Nagano (JP); Isao Sakamaki, legal representative, Nagano (JP); Tadashi Taniguchi, Ojiya (JP)

(73) Assignee: Yukiwa Seiko Kabushiki Kaisha, Niigata (JP)

( * ) Notice: Subject to any disclaimer, the term of this patent is extended or adjusted under 35 U.S.C. 154(b) by 817 days.

(21) Appl. No.: 13/258,848

(22) PCT Filed: Mar. 30, 2010

(86) PCT No.: PCT/JP2010/055766
§ 371 (c)(1),
(2), (4) Date: Sep. 22, 2011

(87) PCT Pub. No.: WO2010/125887
PCT Pub. Date: Nov. 4, 2010

(65) Prior Publication Data
US 2012/0007322 A1    Jan. 12, 2012

(30) Foreign Application Priority Data
Apr. 30, 2009 (JP) .................. 2009-111447

(51) Int. Cl.
*B23B 31/16* (2006.01)
*B23B 31/163* (2006.01)
*B23B 31/12* (2006.01)

(52) U.S. Cl.
CPC ......... *B23B 31/16004* (2013.01); *B23B 31/123* (2013.01); *B23B 31/1238* (2013.01)

(58) Field of Classification Search
CPC .............. B23B 31/123; B23B 31/1238; B23B 31/16004
USPC ..................... 279/60–65, 140, 902

IPC .............. B23B 31/16
See application file for complete search history.

(56) References Cited

U.S. PATENT DOCUMENTS 4,951,955 A * 8/1990 Sakamaki .............. 279/62
5,044,643 A   9/1991 Nakamura
(Continued)

FOREIGN PATENT DOCUMENTS

AU    4777196 A    8/1996
BR    9605123 A    10/1997
(Continued)

OTHER PUBLICATIONS

English Translation of International Preliminary Report on Patentability for PCT/JP2010/055766 dated Nov. 17, 2011.
(Continued)

*Primary Examiner* — Eric A Gates
(74) *Attorney, Agent, or Firm* — Sughrue Mion, PLLC

(57) ABSTRACT

A chuck device in which a rotary sleeve provided to a main body is rotated, and by rotation of an annular rotary body which rotates together with the rotary sleeve, jaws screwed together with the rotary body are expanded, contracted, advanced, and retracted, and a tool is gripped by the jaws; the chuck device comprising a retaining engaging body for engaging with the rotary body and preventing the rotary sleeve from coming out of the rotary body; wherein the retaining engaging body is provided to be fixed to a proximal end side of the rotary sleeve; a rotation transmission part for directly or indirectly transmitting the rotation of the rotary sleeve to the rotary body is provided to the retaining engaging body; and the rotation of the rotary sleeve is transmitted to the rotary body via the retaining engaging body, and the rotary body rotates together with the rotary sleeve.

10 Claims, 8 Drawing Sheets

(56) References Cited

U.S. PATENT DOCUMENTS

| | | | | |
|---|---|---|---|---|
| 5,172,923 | A | * | 12/1992 | Nakamura .............. 279/62 |
| 5,261,679 | A | * | 11/1993 | Nakamura .............. 279/62 |
| 5,322,303 | A | * | 6/1994 | Nakamura .............. 279/62 |
| 5,531,461 | A | | 7/1996 | Huff et al. |
| 5,615,899 | A | * | 4/1997 | Sakamaki ................ 279/62 |
| 5,992,859 | A | * | 11/1999 | Lin .......................... 279/62 |
| 6,550,785 | B2 | * | 4/2003 | Rohm ...................... 279/62 |
| 6,659,474 | B2 | * | 12/2003 | Sakamaki et al. ...... 279/62 |
| 6,824,141 | B1 | * | 11/2004 | Sakamaki et al. ...... 279/62 |
| 6,883,809 | B2 | * | 4/2005 | Rohm ...................... 279/62 |
| 6,959,931 | B2 | * | 11/2005 | Sakamaki et al. ...... 279/62 |
| 7,207,573 | B2 | * | 4/2007 | Sakamaki et al. ...... 279/62 |
| 7,431,308 | B2 | * | 10/2008 | Cachod ................... 279/62 |
| 7,654,539 | B2 | * | 2/2010 | Yang et al. ............. 279/62 |
| 7,896,356 | B2 | * | 3/2011 | Zhou et al. ............. 279/62 |
| 7,946,594 | B2 | * | 5/2011 | Tan ......................... 279/62 |
| 8,141,883 | B2 | * | 3/2012 | Hu et al. ................. 279/62 |
| 8,215,649 | B2 | * | 7/2012 | Mack ....................... 279/62 |
| 8,740,227 | B2 | * | 6/2014 | Zhou et al. .............. 279/62 |
| 2002/0053773 | A1 | * | 5/2002 | Rohm ...................... 279/62 |
| 2003/0020242 | A1 | * | 1/2003 | Mack ....................... 279/60 |
| 2007/0052182 | A1 | * | 3/2007 | Bordeianu ............... 279/62 |
| 2009/0045594 | A1 | * | 2/2009 | Yaksich ................... 279/62 |

FOREIGN PATENT DOCUMENTS

| | | |
|---|---|---|
| CA | 2028001 C | 4/1991 |
| CA | 2187453 A1 | 8/1996 |
| CN | 1051003 A | 5/1991 |
| CN | 1149847 A | 5/1997 |
| CN | 201214155 Y | 4/2009 |
| DE | 40 33 122 A1 | 4/1991 |
| DE | 694 16 370 T2 | 6/1999 |
| EP | 0 645 209 A1 | 3/1995 |
| EP | 1462196 A1 * | 9/2004 .............. B23B 31/12 |
| EP | 1498202 A1 * | 1/2005 .............. B23B 31/12 |
| FR | 2 653 372 A1 | 4/1991 |
| GB | 2 236 968 A | 4/1991 |
| IT | 1241650 B | 1/1994 |
| JP | 03-019705 A | 1/1991 |
| JP | 03-136706 A | 6/1991 |
| JP | 09-225713 A | 9/1997 |
| JP | 9-511697 A | 11/1997 |
| JP | 4053301 B2 | 2/2008 |
| MX | 9604682 A | 5/1998 |
| RU | 2 125 506 C1 | 1/1999 |
| WO | 96/24457 A1 | 8/1996 |
| WO | WO 02100584 A1 * | 12/2002 .............. B23B 31/12 |
| WO | WO 2006119685 A1 * | 11/2006 |
| WO | WO 2008009171 A1 * | 1/2008 .............. B23B 31/12 |
| WO | WO 2008064523 A1 * | 6/2008 .............. B23B 31/12 |
| WO | WO 2008092300 A1 * | 8/2008 .............. B23B 31/12 |

OTHER PUBLICATIONS

Chinese Office Action issued in Chinese Application No. 201080018952.6 dated Mar. 5, 2013.
Chinese Office Action issued in Chinese Application No. 201080018952.6 dated Oct. 24, 2013.
Chinese Office Action issued in Chinese Application No. 201080018952.6 dated Mar. 26, 2014.
International Search Report for PCT/JP2010/055766, dated Jun. 22, 2010.

* cited by examiner

CHUCK DEVICE

TECHNICAL FIELD

The present invention relates to a chuck device.

BACKGROUND ART

In a conventional chuck device as disclosed in Patent Document 1, a rotary sleeve provided to a main body is rotated, and by the rotation of a rotary nut which rotates together with the rotary sleeve, jaws which are screwed together with the rotary nut are expanded, contracted, and slid, and a tool is gripped by the jaws.

Known structures for preventing disengagement between the rotary nut or the main body and the rotary sleeve in such a chuck device include a structure such as the one disclosed in Patent Document 1, for example, in which a C-shaped stop ring (retaining ring) is placed in a groove provided to the internal peripheral surface of the proximal end side of the rotary sleeve, and the (shape-retaining ring for retaining the shape of the) rotary nut is engaged in the stop ring and retained; and a structure such as the one disclosed in Patent Document 2, in which a stop ring the same as the one described above is placed in a groove provided to the internal peripheral surface of a distal-end opening of a rotary sleeve (external cover part) in which jaws retract, and the main body (chuck body) is engaged in the stop ring and retained. The rotary nut is annular and fitted in the main body, and disengagement of the rotary sleeve is prevented by retaining either the rotary nut or the main body.

PRIOR ART DOCUMENTS

Patent Documents

[Patent Document 1] Japanese Patent No. 4053301
[Patent Document 2] Japanese Laid-open Patent Publication No. 9-225713

DISCLOSURE OF THE INVENTION

Problems that the Invention is Intended to Solve

The present invention was developed as a result of research into developing, in view of the foregoing conditions, a disengagement prevention structure whereby a stronger linkage is achieved between the rotary nut (rotary body) or the main body and the rotary sleeve, and an object of the present invention is to provide a practical chuck device which is not only capable of providing more reliable and stable retention between the rotary body or the main body and the rotary sleeve, but also has excellent mass-productivity.

Means for Solving the Problems

The main points of the present invention are described below with reference to the attached drawings.

The present invention relates to a chuck device in which a rotary sleeve 2 provided to a main body 1 is rotated, and the rotation of an annular rotary body 3 which rotates together with the rotary sleeve 2 causes jaws 4 screwed together with the rotary body 3 to expand, contract, advance, and retract, and a tool to be gripped by the jaws 4; the chuck device characterized in comprising a retaining engaging body 5 for engaging with the rotary body 3 or the main body 1 and preventing the rotary sleeve from coming out of the rotary body 3 or the main body 1; wherein the retaining engaging body 5 is provided so as to be fixed to a proximal end side of the rotary sleeve 2; a rotation transmission part for directly or indirectly transmitting the rotation of the rotary sleeve 2 to the rotary body 3 is provided to the retaining engaging body 5; and the rotation of the rotary sleeve 2 is transmitted to the rotary body 3 via the retaining engaging body 5, and the rotary body 3 rotates together with the rotary sleeve 2.

The present invention also relates to a chuck device in which a rotary sleeve 2 provided to a main body 1 is rotated, and the rotation of an annular rotary body 3 which rotates together with the rotary sleeve 2 causes jaws 4 screwed together with the rotary body 3 to expand, contract, advance, and retract, and a tool to be gripped by the jaws 4; the chuck device characterized in comprising a retaining engaging body 5 for engaging with the rotary body 3 or the main body 1 and preventing the rotary sleeve from coming out of the rotary body 3 or the main body 1; wherein the retaining engaging body 5 is provided so as to be fixed to a proximal end side of the rotary sleeve 2; a middle sleeve body 10 for fitting with the rotary body 3 is provided on the inside of the rotary sleeve 2; a rotation transmission part for transmitting the rotation of the rotary sleeve 2 to the rotary body 3 via the middle sleeve body 10 is provided to the retaining engaging body 5; and the rotation of the rotary sleeve 2 is transmitted to the rotary body 3 via the retaining engaging body 5 and the middle sleeve body 10, and the rotary body 3 rotates together with the rotary sleeve 2.

The present invention also relates to a chuck device, wherein, in the chuck device according to a second aspect, the retaining engaging body 5 is provided with a co-rotation fitting part 7 as the rotation transmission part, for fitting with a recessed part 11 or projected part provided to the middle sleeve body 10.

The present invention also relates to a chuck device, wherein, in the chuck device according to a third aspect, the retaining engaging body 5 comprises a cylindrical fixed part 8 fixed to the rotary sleeve 2; a protruding part 6 for preventing the rotary sleeve 2 from coming out of the rotary body 3 or the main body 1, the protruding part 6 protruding toward the inside of the cylindrical fixed part 8 and abutting the rotary body 3 or the main body 1; and the co-rotation fitting part 7 provided to said cylindrical fixed part 8.

The present invention also relates to a chuck device, wherein, in the chuck device according to a fourth aspect, the protruding part 6 extends in a direction intersecting with the rotational axis of the rotary sleeve 2.

The present invention also relates to a chuck device, wherein, in the chuck device according to a fifth aspect, the co-rotation fitting part 7 extends in the rotational axis direction of the rotary sleeve 2.

The present invention also relates to a chuck device, wherein, in the chuck device according to a sixth aspect, the protruding part 6 and the co-rotation fitting part 7 are provided so that the extension directions thereof intersect each other at substantially a right angle.

The present invention also relates to a chuck device, wherein, in the chuck device according to a seventh aspect, the cylindrical fixed part 8 is press-fitted on an internal peripheral surface of the rotary sleeve 2 so as to be fixed to the rotary sleeve 2.

The present invention also relates to a chuck device, wherein, in the chuck device according to an eighth aspect, the retaining engaging body 5 is made of metal, and the protruding part 6, the co-rotation fitting part 7, and the cylindrical fixed part 8 are formed so as to be integrally molded.

The present invention also relates to a chuck device, wherein, in the chuck device according to any of a third through ninth aspect, the middle sleeve body 10 is provided with a rotation-transmitting engaging part 9 disposed between a plurality of projections 14a, 14b, 14c, 14d provided to the rotary body 3, the rotation-transmitting engaging part 9 engaging with the projections 14a, 14b, 14c, 14d and transmitting the rotation of the rotary sleeve 2 to the rotary body 3.

The present invention also relates to a chuck device, wherein, in the chuck device according to a tenth aspect, the rotary sleeve 2 is made of metal, and the middle sleeve body 10 is made of synthetic resin.

The present invention also relates to a chuck device, wherein, in the chuck device according to an eleventh aspect, the rotary body 3 comprises an annular nut body 12 formed by providing a plurality of split nut bodies in a connected row arrangement, and a shape-retaining ring 13 for retaining the shape of the nut body 12.

The present invention also relates to a chuck device in which a rotary sleeve 2 provided to a main body 1 is rotated, and the rotation of an annular rotary body 3 which rotates together with the rotary sleeve 2 causes jaws 4 screwed together with the rotary body 3 to expand, contract, advance, and retract, and a tool to be gripped by the jaws 4; the chuck device characterized in comprising a retaining engaging body 5 for engaging with the rotary body 3 or the main body 1 and preventing the rotary sleeve from coming out of the rotary body 3 or the main body 1; wherein the retaining engaging body 5 is provided so as to be fixed to a proximal end side of the rotary sleeve 2; a rotation transmission part for transmitting the rotation of the rotary sleeve 2 to the rotary body 3 is provided to the retaining engaging body 5; and the rotation of the rotary sleeve 2 is transmitted to the rotary body 3 via the retaining engaging body 5, and the rotary body 3 rotates together with the rotary sleeve 2.

The present invention also relates to a chuck device, wherein, in the chuck device according to a thirteenth aspect, the retaining engaging body 5 is provided with a co-rotation fitting part 7 as the rotation transmission part, for fitting with a recessed part 11 or projected part provided to the rotary body 3.

The present invention also relates to a chuck device, wherein, in the chuck device according to a fourteenth aspect, the rotary body 3 comprises an annular nut body 12 formed by providing a plurality of split nut bodies in a connected row arrangement, and a shape-retaining ring 13 for retaining the shape of the nut body 12; and the recessed part 11 or projected part is provided to the shape-retaining ring 13.

The present invention also relates to a chuck device, wherein, in the chuck device according to a fifteenth aspect, the recessed part 11 or projected part is provided to a flange part 40 provided to an upper end part of the shape-retaining ring 13.

Effect of the Invention

Through the present invention configured as described above, a practical chuck device is provided which is not only capable of providing more reliable and stable retention between the rotary body or the main body and the rotary sleeve, but also has excellent mass-productivity.

BEST MODE FOR CARRYING OUT THE INVENTION

Figure 1:
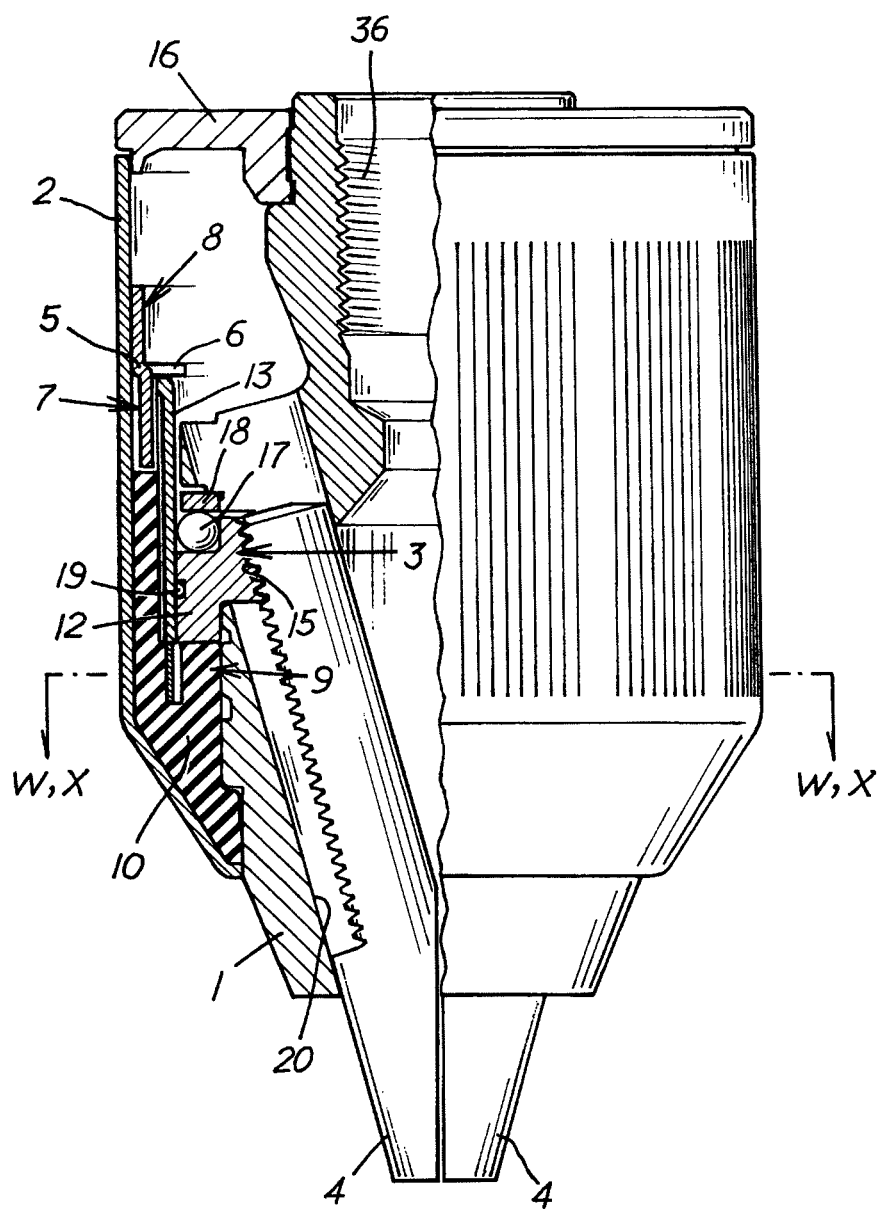
FIG. 1 is rough front view showing a partial cut-away view of the present example.
Figure 2:
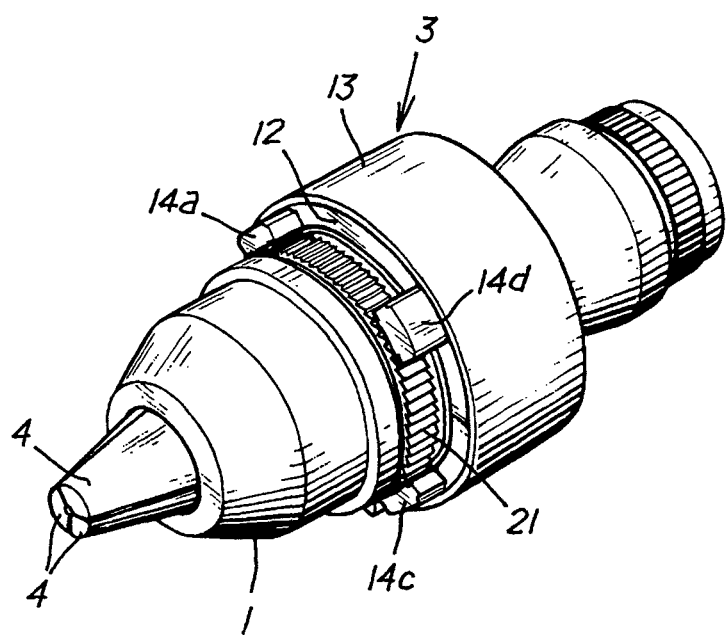
FIG. 2 is a rough perspective view showing the main body on which the rotary body is fitted in the present example.

Preferred examples of the present invention are briefly described below with reference to the diagrams while indicating the effects of the present invention.

A retaining engaging body 5 for preventing a rotary sleeve 2 from coming out of a rotary body 3 or a main body 1 is provided so as to be fixed to the rotary sleeve 2, and even when impact or vibration occurs during work using a gripped tool, the rotary sleeve 2 can reliably be prevented from separating from the rotary body 3 or the main body 1.

By providing a rotation transmission part to the retaining engaging body 5, the retaining engaging body 5 can be endowed not only with retaining and engaging effects, but also with rotation-transmitting effects, and such a simple configuration enables rotation of the rotary sleeve 2 to be transmitted to the rotary body 3.

Furthermore, by providing a co-rotation fitting part 7 as the rotation transmission part to the retaining engaging body 5, for example, it is possible to provide a middle sleeve body 10, for example, and even when the rotary sleeve 2 is made of metal in order to increase the strength of the external peripheral part, the middle sleeve body 10 is made of synthetic resin, the inside surface and other parts of the middle sleeve body 10 can easily be molded in the desired shape, and accordingly excellent workability and mass-productivity are obtained.

EXAMPLES

Specific examples of the present invention are described below with reference to the diagrams.

The present example is of a chuck device in which a rotary sleeve 2 is rotated, whereby a plurality of jaws 4 inserted in a hole 20 provided at the distal end of the main body 1 are expanded, contracted, and slid, and a tool is gripped by the jaws 4. In the chuck device, annular ratchet teeth 21 are provided to the main body 1, an annular rotary body 3 which rotates together with the rotary sleeve 2 is screwed together with the jaws 4 and fitted in the main body 1 on the inside of the rotary sleeve 2, a detachable engaging spring for engaging with the ratchet teeth 21 is provided on the outside of the ratchet teeth 21, the engaging spring is provided so as to rotate on the periphery of the ratchet teeth 21 in conjunction with the rotation of the rotary body 3, the engaging spring is attached to the rotary body 3 by a recessed/projected fitting means, and a maintaining part 23 is provided for maintaining the state in which the ratchet teeth 21 and the engaging spring are engaged, and the state in which the ratchet teeth 21 and the engaging spring are disengaged. The chuck device is configured having a retaining engaging body 5 for engaging with the rotary body 3 or the main body 1 and preventing the rotary sleeve 2 from coming out of the rotary body 3 or the main body 1, wherein the retaining engaging body 5 is provided so as to be fixed to the proximal end of the rotary body 3 with respect to the rotary sleeve 2, a middle sleeve body 10 for fitting with the rotary body 3 is provided between the rotary sleeve 2 and the main body 1, a co-rotation fitting part 7 for fitting with a recessed part 11 or projected part provided to the middle sleeve body 10 is provided to the retaining engaging body 5, the rotation of the rotary sleeve 2 is transmitted to the rotary body 3 via the retaining engaging body 5 and the middle sleeve body 10, and the rotary body 3 rotates together with the rotary sleeve 2.

The present example is of a specific implementation of the present invention as a chuck device used in a so-called hammer drill, vibration drill, drill driver, or other rotary power tool for imparting vibration or impact, and a coupling hole 36 for coupling with the main shaft of the rotary power tool is provided to the proximal end part of the main body 1.

The main body 1 is made using iron, steel, stainless steel, or other metal; aluminum, magnesium, titanium, or other non-ferrous metal; an alloy of these metals; or a synthetic resin, fiber-reinforced resin, or the like. The main body 1 is made of steel in the present example.

As shown in FIG. 1, three jaws 4 are provided at an angle in the hole 20 formed in the main body 1, and the annular rotary body 3 screwed together with a threaded part 15 formed on the external surface of the jaws 4 is provided so as to be fitted on the jaws 4.

The rotary body 3 is composed of a plurality of split nut bodies 12 split in the peripheral direction, and a shape-retaining ring 13 for retaining the shape of the plurality of split nut bodies 12 (wherein the split nut bodies 12 and the shape-retaining ring 13 rotate in integral fashion). The reference numeral 17 in the drawings refers to a steel ball, 18 to a steel ball holder, and 19 to an O-ring. A configuration employing split nut bodies is not limiting, and a nut body that is integrated in advance may also be used.

Figure 3:
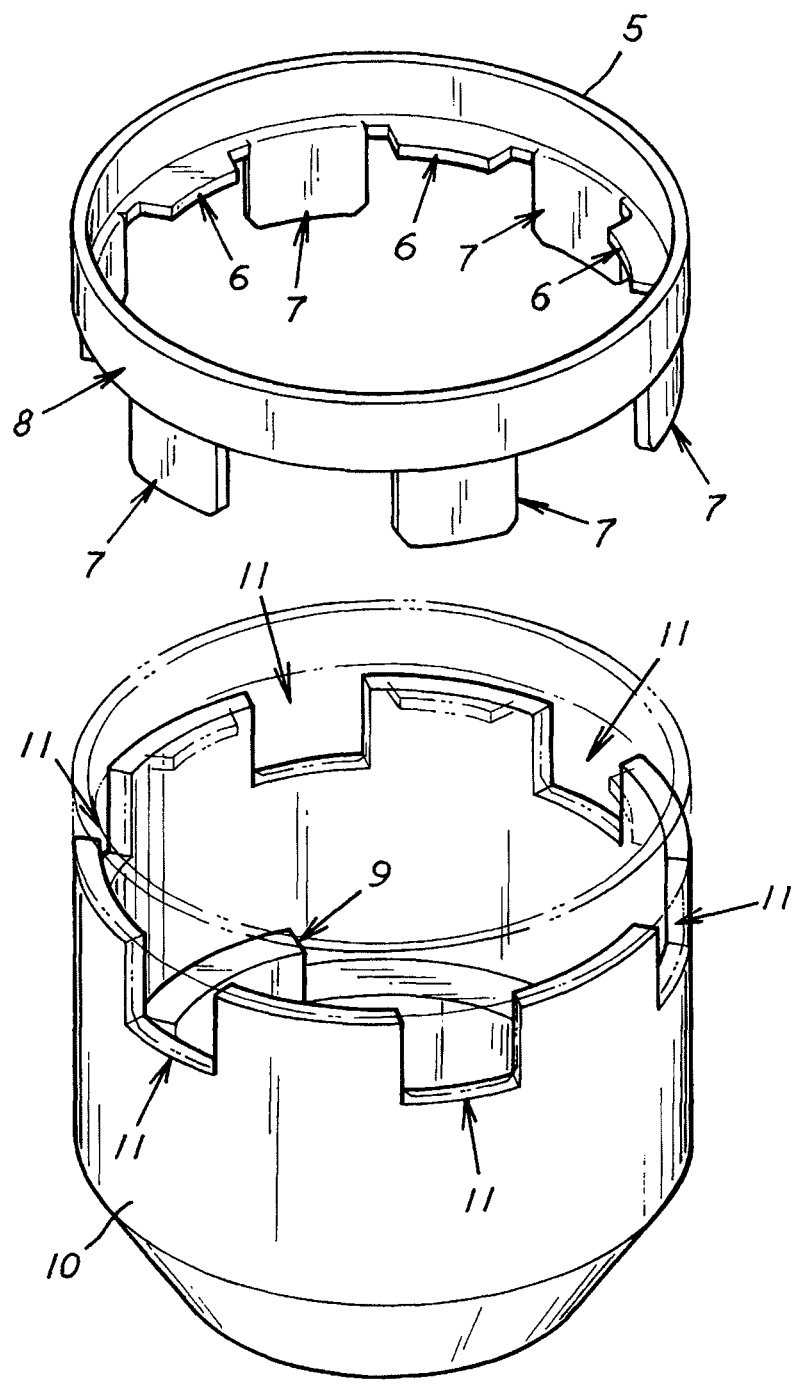
FIG. 3 is a rough exploded perspective view showing the middle sleeve body and the dropout prevention body of the present example.
Figure 4:
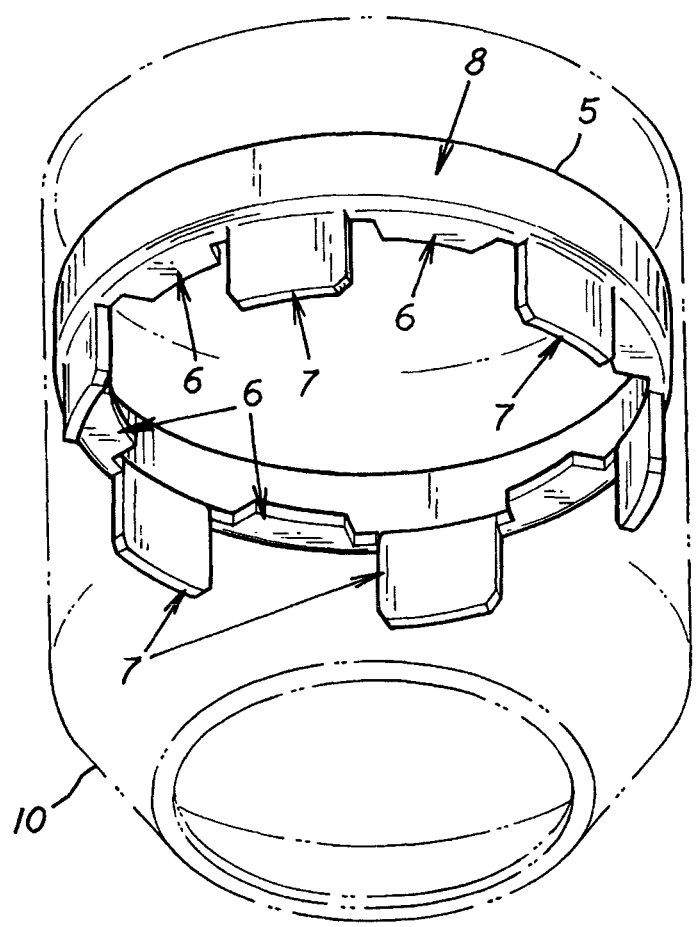
FIG. 4 is a rough perspective view showing the middle sleeve body and the dropout prevention body of the present example.
Figure 6:
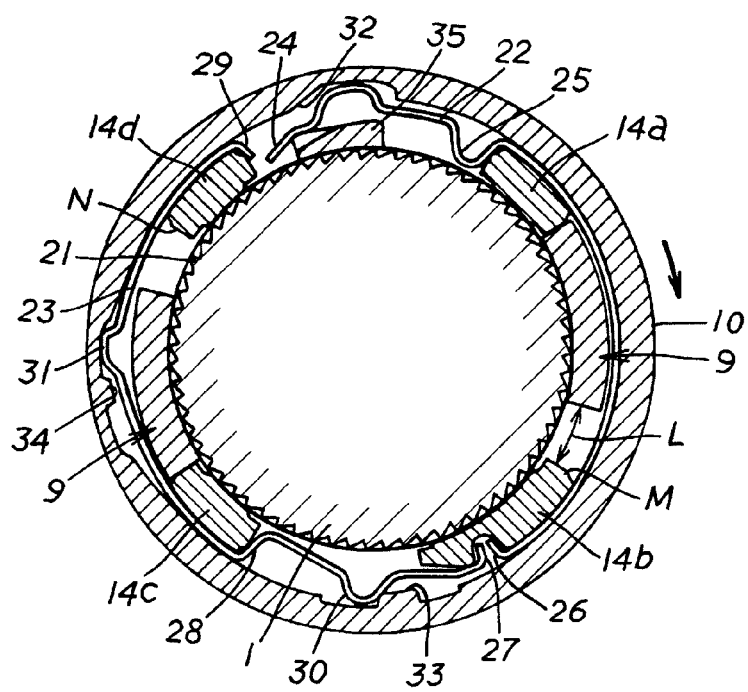
FIG. 6 is a sectional view along line W-W of FIG. 1, showing the operation of the present example.
Figure 7:
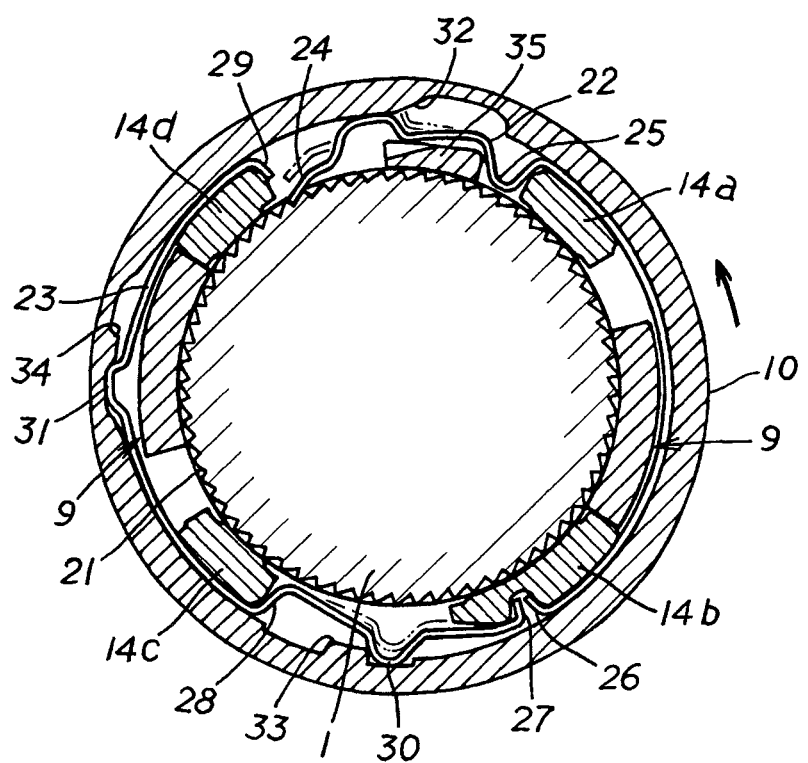
FIG. 7 is a sectional view along line X-X of FIG. 1, showing the operation of the present example.

A middle sleeve body 10 made of synthetic resin is fitted on the distal end side of the rotary body 3 with respect to the main body 1. As shown in FIGS. 3, 6, and 7, the middle sleeve body 10 is provided with a rotation-transmitting engaging part 9 disposed between a plurality of projections 14a, 14b, 14c, 14d provided so as to protrude to the distal-end side from the split nut bodies 12, the rotation-transmitting engaging part 9 engaging with the projections 14a, 14b, 14c, 14d and transmitting the rotation of the rotary sleeve 2 to the rotary body 3. In the present example, rotation-transmitting engaging parts 9 are provided as a facing pair. As shown in FIGS. 3 and 4, recessed parts 11 for fitting with co-rotation fitting parts 7 of the retaining engaging body 5 are provided at predetermined intervals in the peripheral direction at the proximal end of the middle sleeve body 10.

In the present example, a configuration is adopted in which the rotary sleeve 2 is rotated, the rotation is transmitted to the nut bodies 12, and the rotary body 3 is rotated, but a configuration may also be adopted in which the rotation of the rotary sleeve 2 is transmitted to the shape-retaining ring 13 to rotate the rotary body 3.

An engaging spring body is attached in a co-rotating state to the projections 14a, 14b, 14c, 14d provided to the nut bodies 12 of the rotary body 3. Annular ratchet teeth 21 for meshing with a distal-end engaging part of the engaging spring body are formed in the main body 1 at the distal-end side of the rotary body 3. The ratchet teeth 21 may be formed directly in the main body 1, or may be formed separately from the main body 1 by a hard member 13 having high hardness, e.g., a stainless steel member. Engagement of the ratchet teeth 21 and the distal-end engaging part produces a state in which the nut bodies 12 can rotate in only one direction (non-reversible state). The engaging spring body and the ratchet teeth are described in detail hereinafter.

The rotary sleeve 2 made of metal (steel) is fitted on the main body 1 on which the rotary body 3 and the middle sleeve body 10 are fitted. The rotary sleeve 2 is not limited to being made of metal, and may be made of resin.

The annular retaining engaging body 5 made of metal (steel) is press-fitted on the proximal-end side of the rotary sleeve 2. Specifically, the retaining engaging body 5 has a cylindrical fixed part 8 formed by an annular thin plate having a slightly larger diameter than an internal peripheral surface of the proximal-end side of the rotary sleeve 2, which has a substantially constant diameter. The middle sleeve body 10 is fitted on the main body 1 to which the rotary body 3 is provided, the rotary sleeve 2 is fitted on the main body 1 on which the middle sleeve body 10 is fitted, the retaining engaging body 5 is inserted from the proximal-end side of the rotary sleeve 2, and the cylindrical fixed part 8 is press-fitted to the rotary sleeve at a position on the proximal-end side with respect to the rotary body 3, and is thereby provided so as to be fixed to the rotary sleeve 2. Since the rotary sleeve 2 and the retaining engaging body 5 are both made of metal, the retaining engaging body 5 is very securely fixed by the press-fitting. The cylindrical fixed part 8 is also not limited to being press-fitted at a position on the proximal-end side with respect to the rotary body 3, i.e., a position on the proximal-end side with respect to the site at which the nut bodies 12 of the rotary body 3 and the threaded part 15 of the jaws 4 are screwed together, for example, and the cylindrical fixed part 8 may also be press-fitted at a position on the distal-end side (or at substantially the same position as the threaded part) with respect to the threaded part.

The retaining engaging body 5 is composed of the cylindrical fixed part 8 fixed to the rotary sleeve 2; protruding parts 6 for protruding toward the inside of the cylindrical fixed part 8 and abutting the rotary body 3 or the main body 1 to prevent the rotary sleeve 2 from coming out of the rotary body 3 or the main body 1; and the co-rotation fitting parts 7 for transmitting the rotation of the rotary sleeve 2 provided to the cylindrical fixed part 8. Specifically, the protruding parts 6 protrude a predetermined amount toward the inside of the rotary sleeve 2 from the lower end part of the cylindrical fixed part 8, and are configured so as to abut the (shape-retaining ring 13 of the) rotary body 3. The protruding parts 6 are not limited to abutting the rotary body 3, and may also be configured so as to abut the main body 1, but when the retaining engaging body 5 (protruding parts 6) touches the main body 1, a loss due to friction occurs between the retaining engaging body 5 and the main body 1 (not necessarily meaning that there is always contact with the protruding parts 6).

The protruding parts 6 of the retaining engaging body 5 are plate-shaped and extend in a direction which intersects with the rotational axis of the rotary sleeve 2 (the direction orthogonal to the rotational axis of the rotary sleeve 2), and the distal-end surfaces of the protruding parts 6 are set as the surfaces that abut the rotary body 3 or the main body 1.

The co-rotation fitting parts 7 of the retaining engaging body 5 are also plate-shaped, and extend in the rotational axis direction of the rotary sleeve 2 (the direction parallel to the rotational axis of the rotary sleeve 2) from the fixed part 8. The same number of co-rotation fitting parts 7 as recessed parts are provided at predetermined intervals at positions corresponding to the recessed parts 11 provided in the proximal-end part of the middle sleeve body 10, and the protruding parts 6 are provided between the co-rotation fitting parts 7. The co-rotation fitting parts 7 are provided via a shoulder so as not to touch the internal peripheral surface of the rotary sleeve 2 and the shape-retaining ring 13 of the rotary body 3. The co-rotation fitting parts 7 are designed to have substantially the same width as the recessed parts 11.

Figure 5:
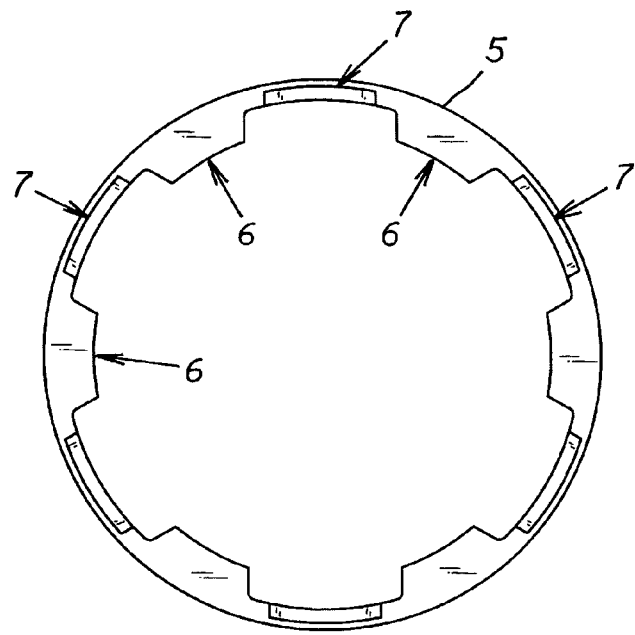
FIG. 5 is a rough bottom view showing the dropout prevention body of the present example.

As shown in FIGS. 3 through 5, the retaining engaging body 5 of the present example is configured so that equal numbers of the protruding parts 6 extending in a direction that intersects with the rotational axis of the rotary sleeve 2, and the co-rotation fitting parts 7 extending in the rotational axis direction of the rotary sleeve 2 in the cylindrical fixed part 8 are arranged in alternating fashion in the peripheral direction of the fixed part 8 so that the extension directions thereof intersect each other at a substantially right angle.

The retaining engaging body 5 is formed by integrally molding the protruding parts 6, the co-rotation fitting parts 7, and the cylindrical fixed part 8.

The co-rotation fitting parts 7 of the retaining engaging body 5 which is provided so as to be fixed to the rotary sleeve 2 thereby cause the middle sleeve body 10 to rotate integrally with the rotary sleeve 2, the rotation of the middle sleeve body 10 is transmitted to the (nut bodies 12 of the) rotary body 3 via the rotation-transmitting engaging parts 9, and the jaws 4 can be expanded, contracted, advanced, and retracted by the rotation of the rotary sleeve 2.

In the present example, the retaining engaging body 5 is configured so as to indirectly transmit the rotation of the rotary sleeve 2 to the rotary body 3 via the middle sleeve body 10, but a configuration may also be adopted in which the middle sleeve body 10 is not provided, a rotation transmission part (co-rotation fitting parts 7) is directly fitted with recessed parts 11 or projected parts (the same as those of the middle sleeve body 10 described above) provided to the proximal-end part of the rotary body 3 (the nut bodies 12 or the shape-retaining ring 13), and the rotation of the rotary sleeve 2 is thus transmitted. In this case, not providing a ratchet mechanism allows a simpler configuration when the application does not require prevention of loosening, and the work of assembly is also facilitated.

Figure 8:
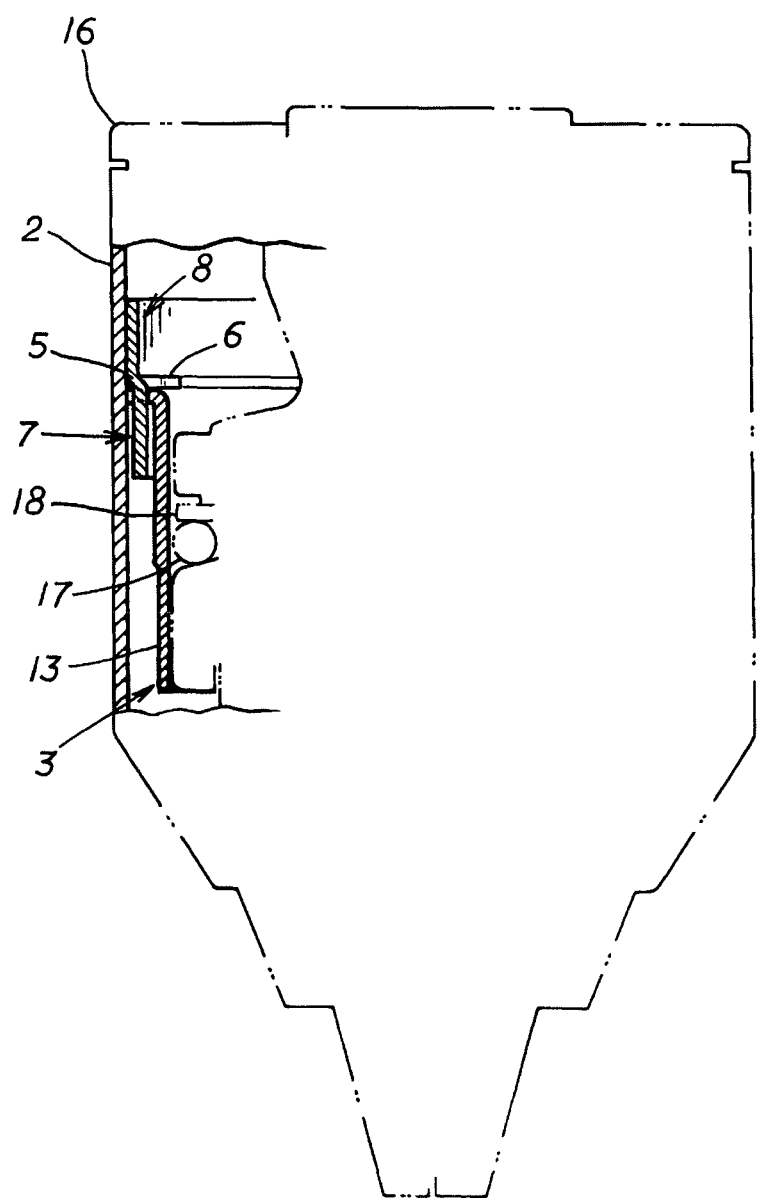
FIG. 8 is a rough front view showing a partial cut-away view of another example.
Figure 9:
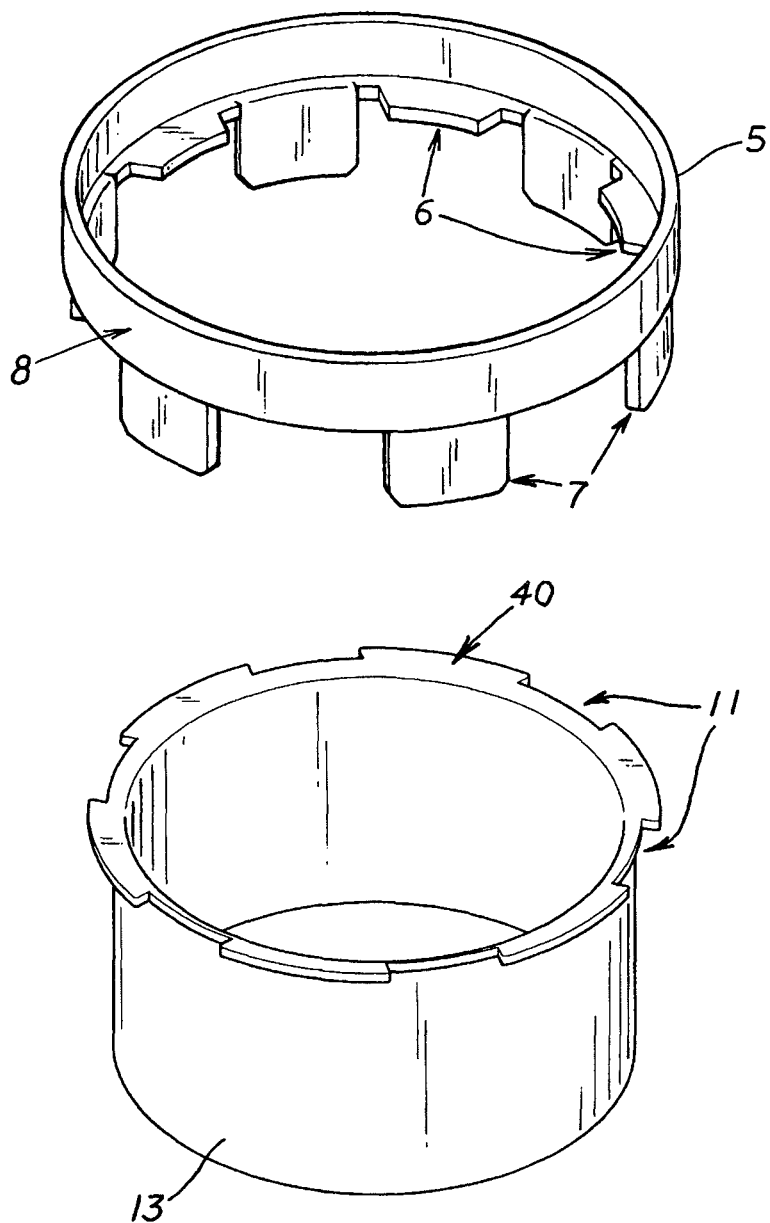
FIG. 9 is a rough exploded perspective view showing the shape-retaining ring and the dropout prevention body of another example.

For example, a configuration may be adopted in which a flange part 40 is provided at the upper end part of the shape-retaining ring 13, notched parts (recessed parts 11) having substantially the same width as the co-rotation fitting parts 7 or a slightly larger width than the co-rotation fitting parts 7 are formed at substantially the same interval as that of the co-rotation fitting parts 7 at the distal end of the flange part 40, and the co-rotation fitting parts 7 are fitted with the notched parts, as in the other examples shown in FIGS. 8 and 9. In this case, the rotation of the rotary sleeve 2 can be directly transmitted to the rotary body 3 without the intervention of the middle sleeve body 10.

In the present example, the co-rotation fitting parts 7 are employed as rotation transmission parts to transmit the rotation of the rotary sleeve 2 to the rotary body 3, but a configuration may also be adopted in which a portion of the retaining engaging body 5 is press-fitted with the middle sleeve body 10 (shape-retaining ring 13 of the rotary body 3), for example, so that the middle sleeve body 10 (rotary body 3) and the rotary sleeve 2 rotate together and the rotation of the rotary sleeve 2 is transmitted to the rotary body 3 (the press-fitted part at which the retaining engaging body 5 is press-fitted may be the rotation transmission part).

The engaging spring body and the ratchet teeth will next be described with reference to FIGS. 6 and 7.

The engaging spring body is made of metal (iron or steel), and is disposed on the periphery of the ratchet teeth 21 so as to be supported by the internal surface of the middle sleeve body 10. The rotational force of the rotary sleeve 2 is transmitted in the same manner even when transmitted through the shape-retaining ring 13.

The engaging spring body of the present example is composed of two engaging spring bodies 22, 23. One engaging spring body 22 has the operation of engaging with the ratchet teeth 21, and the other engaging spring body 23 has the operation of maintaining the engaging spring body 22 in a predetermined position by maintaining the position of the rotary sleeve 2. In the present example thus configured, the operation of engaging with the ratchet teeth 21, and the operations of maintaining and releasing engagement with the ratchet teeth 21 are handled by separate springs, but a configuration may also be adopted in which these operations are handled by a single engaging spring body.

The engaging spring body 22 is provided with two projections 25, 26 and a distal-end engaging part 24 for engaging with the ratchet teeth 21. The engaging spring body 22 is attached so as to rotate together with the nut bodies 12 by the projections 25, 26 of the engaging spring body 22 and the (recessed parts of the) projections 14a, 14b of the nut bodies 12.

The engaging spring body 23 is provided with three projections 27, 28, 29. The engaging spring body 23 is attached so as to rotate together with the nut bodies 12 by the projections 27, 28, 29 of the engaging spring body 23 and the (recessed parts of the) projections 14b, 14c, 14d of the nut bodies 12.

Consequently, since the engaging spring bodies 22, 23, the rotation-transmitting engaging parts 9, and the projections 14a, 14b, 14c, 14d are arranged on the same circumference, an accordingly compact design can be obtained.

The engaging spring bodies 22, 23 and the nut bodies 12 may be attached by any configuration insofar as the engaging spring bodies 22, 23 and the nut bodies 12 rotate together. In the present example, the engaging spring bodies 22, 23 are attached to the nut bodies 12 by a recessed/projected fitting means, but the engaging spring bodies 22, 23 may also be attached to the shape-retaining ring 13 by a recessed/projected fitting means.

An interposing body 35 for ensuring reliable release of engagement between the distal-end engaging part 24 of the engaging spring body 22 and the ratchet teeth 21 is provided on the internal surface of the middle sleeve body 10, the distal-end engaging part 24 is received by a tapered surface at the distal end of the interposing body 35, and engagement (meshing) between the distal-end engaging part 24 and the ratchet teeth 21 is reliably released.

The internal surface of the middle sleeve body 10 is provided with an immobilizing part 32 for immobilizing the distal-end engaging part 24 of the engaging spring body 22 and maintaining an engaged state between the distal-end engaging part 24 and the ratchet teeth 21.

The middle sleeve body 10, the distal end of which is received by the main body 1, is fitted on the nut bodies 12, and the middle sleeve body 10 is configured so as to rotate together with the nut bodies 12, but to rotate a predetermined angle in relation to the nut bodies 12 when a predetermined load is placed on the rotation of the nut bodies 12.

The rotation of the middle sleeve body 10 a predetermined angle in relation to the nut bodies 12 is between the projection 14a and the projection 14b, i.e., L in FIG. 6. Through this configuration, when the middle sleeve body 10 rotates together with the rotary sleeve 2 and a load occurs, projections 33, 34 of the middle sleeve body 10 surmount the projections 30, 31 against the spring force of the engaging spring body 23, the end surface of the rotation-transmitting engaging part 9 between the projections 14a, 14b abuts the end surface M of the projection 14b (likewise, the end surface of the rotation-transmitting engaging part 9 between the projections 14c, 14d abuts the end surface N of the projection 14d), the middle sleeve body 10 (rotary sleeve 2) and the nut bodies 12 are integrated, and tightening occurs.

Insofar as the presence of the projections 33, 34 prevents the projections 33, 34 from surmounting the projections 30, 31 of the engaging spring body 23 against the spring force, the rotary sleeve 2 does not rotate in the slackening direction, and an accordingly reliable anti-loosening effect is demonstrated. The anti-loosening force can be set by the spring force of the engaging spring bodies 22, 23, and particularly by the shape of the projections 33, 34 and the projections 30, 31.

Furthermore, anti-slip ribs are formed on the external surface of the rotary sleeve 2, the distal end of the rotary sleeve 2 is received by the main body 1, and the proximal end is received by a receiving member 16 provided to the main body 1. In use of a drill driver or other rotary power tool, rotational force is necessary when opening and closing the chuck or during drilling and other work, but in use of an impact driver, hammer drill, vibration drill, or other rotary power tool, although rotational force is also necessary, since a maintenance force in the axial direction is necessary for retention, a linkage in the form of a patterned knurling provided to the rear end of the main body 1 is preferred as the linkage between the receiving member 16 and the main body 1. The receiving member 16 is exposed on the outside of the rotary sleeve 2 in the present example, but the receiving member 16 may also be accommodated inside the rotary sleeve 2.

Consequently, a tool is gripped by the jaws 4, and when the rotary sleeve 2 is rotated, until a predetermined load is placed on the rotary sleeve 2, the rotary sleeve 2 and the nut bodies 12 rotate together, and the engaging spring bodies 22, 23 thereby also rotate on the periphery of the ratchet teeth 21.

When the rotary sleeve 2 is rotated to a predetermined position (at which the jaws 4 abut the tool), a predetermined load acts on the rotary sleeve 2 (in the state shown in FIG. 6), and when the rotary sleeve 2 in this state is further rotated against the spring force in the direction indicated by the arrow in FIG. 6, the rotary sleeve 2 rotates in relation to the nut bodies 12, the interposing body 35 which receives the distal-end engaging part 24 of the engaging spring body 22 moves, the immobilizing part 32 of the middle sleeve body 10 presses against the distal-end engaging part 24 so that the distal-end engaging part 24 engages with the ratchet teeth 21, the projections 33, 34 of the middle sleeve body 10 surmount the projections 30, 31 of the engaging spring body 23, the rotation-transmitting engaging parts 9 abut the end surface M of the projection 14b and the end surface N of the projected part 14d, respectively, so that the middle sleeve body 10 (rotary sleeve 2) and the nut bodies 12 are integrated; and when the rotary sleeve 2 is further rotated, the distal-end engaging part 24 of the engaging spring body 22 engaged with the ratchet teeth 21 surmounts the ratchet teeth 21 one tooth at a time by a leaf spring effect and engages with a predetermined ratchet tooth 21 (in this state, reverse rotation is prevented by the ratchet teeth 21), the rotation resistance of the rotary sleeve 2 increases, and tightening is completed (state shown in FIG. 7).

Tightening is not yet completed in the state in which the teeth are surmounted one at a time, and when tightening is completed, no surmounting of teeth occurs.

The tightened state is maintained by the projections 33, 34 and projections 30, 31.

When the rotary sleeve 2 is rotated in reverse to release the fastened state, by the reverse of the operations described above, the projections 30, 31 positioned to the right of the projections 33, 34 (in the state shown in FIG. 7) surmount the projections 33, 34, and when the rotary sleeve 2 is further rotated in the direction of the arrow in FIG. 7, the engagement (meshing) between the distal-end engaging part 24 and the ratchet teeth 21 by the immobilizing part 32 is released, the interposing body 35 furthermore moves and lifts up the distal-end engaging part 24 of the engaging spring body 22, and the fastening of the tool is loosened by further rotating the rotary sleeve 2. This state, i.e., the state in which the distal-end engaging part 24 of the engaging spring body 22 and the ratchet teeth 21 are disengaged, is also maintained by the projections 33, 34 and the projections 30, 31.

Consequently, loosening of tool fastening is reliably prevented in the chuck device of the present example, and a superior chuck device is obtained which has a simple structure and excellent durability.

The interposing body 35 in the present example is provided to prevent the distal-end engaging part 24 of the engaging spring body 22 from unexpectedly meshing with the ratchet teeth 21 (consequently, in a state in which the distal-end engaging part 24 is not received by the interposing body 35, i.e., a state in which the immobilizing part 32 does not abut the distal-end engaging part 24, the distal-end engaging part 24 is kept apart from the ratchet teeth 21 by the elasticity of the spring), but the distal-end engaging part 24 may also be configured so that the immobilizing part 32 is unnecessary or omitted, the distal-end engaging part 24 is always meshed with the ratchet teeth 21, and meshing of the distal-end engaging part 24 with the ratchet teeth 21 is forcibly released by the interposing body 35.

Since the present example is configured as described above, even when impact or vibration occurs during work using a gripped tool, the rotary sleeve 2 can be more reliably prevented from separating from the rotary body 3 or the main body 1.

By providing the co-rotation fitting parts 7 of the retaining engaging body 5, the middle sleeve body 10 can be provided, and even in a case in which the rotary sleeve 2 is made of metal in order to increase the strength of the external peripheral part to prevent injury due to friction of the external peripheral part during work, the middle sleeve body 10 is made of synthetic resin, the inside surface (the immobilizing part 32, the projections 33, 34, or the interposing body 35) and other parts of the middle sleeve body 10 can easily be molded in the desired shape, and accordingly excellent workability and mass-productivity are obtained. Since the middle sleeve body 10 and the rotary sleeve 2 are separate, even when the exterior design of the rotary sleeve 2 is changed, the middle sleeve body 10 can be diverted so that only the rotary sleeve 2 need be replaced. The exterior design of the rotary sleeve 2 can therefore be changed accordingly more easily and inexpensively. The present example is thus a practical chuck device which is not only capable of providing more reliable and stable retention between the rotary body or the main body and the rotary sleeve, but also has excellent mass-productivity.

The invention claimed is:

1. A chuck device in which a rotary sleeve provided to a main body is rotated, and the rotation of an annular rotary body which rotates together with the rotary sleeve causes jaws screwed together with said annular rotary body to expand, contract, advance, and retract, and causes a tool to be gripped by the jaws;

said chuck device comprising:

a retaining engaging body for engaging with said annular rotary body or said main body and preventing said rotary sleeve from coming out of said annular rotary body or said main body;

a middle sleeve body for fitting with said annular rotary body provided on the inside of said rotary sleeve; and a rotation transmission part for transmitting the rotation of said rotary sleeve to said rotary body via said middle sleeve body provided to said retaining engaging body, wherein the retaining engaging body is provided so as to be fixed to a proximal end side of said rotary sleeve;

the rotation of said rotary sleeve is transmitted to said annular rotary body via said retaining engaging body and said middle sleeve body, and said annular rotary body rotates together with said rotary sleeve; and said retaining engaging body is provided with a co-rotation fitting part as said rotation transmission part, for fitting with a recessed part or projected part provided to said middle sleeve body in a fixed manner.

2. The chuck device according to claim 1, wherein said retaining engaging body comprises:

a cylindrical fixed part fixed to said rotary sleeve; and a protruding part for preventing said rotary sleeve from coming out of the rotary body or the main body, the protruding part protruding toward the inside of the cylindrical fixed part and abutting said rotary body or said main body; and said co-rotation fitting part provided to said cylindrical fixed part.

3. The chuck device according to claim 2, wherein said protruding part extends in a direction intersecting with the rotational axis of said rotary sleeve.

4. The chuck device according to claim 3, wherein said co-rotation fitting part extends in the rotational axis direction of said rotary sleeve.

5. The chuck device according to claim 4, wherein said protruding part and said co-rotation fitting part are provided so that the extension directions thereof intersect each other at substantially a right angle.

6. The chuck device according to claim 5, wherein said cylindrical fixed part is press-fitted on an internal peripheral surface of said rotary sleeve so as to be fixed to said rotary sleeve.

7. The chuck device according to claim 6, wherein said retaining engaging body is made of metal, and said protruding part, said co-rotation fitting part, and said cylindrical fixed part are formed so as to be integrally molded.

8. The chuck device according to any of claims 1 and 2-7, wherein said middle sleeve body is provided with a rotation-transmitting engaging part disposed between a plurality of projections provided to said annular rotary body, the rotation-transmitting engaging part engaging with the projections and transmitting the rotation of said rotary sleeve to said annular rotary body.

9. The chuck device according to claim 8, wherein said rotary sleeve is made of metal, and said middle sleeve body is made of synthetic resin.

10. The chuck device according to claim 9, wherein said rotary body comprises an annular nut body formed by providing a plurality of split nut bodies in a connected row arrangement, and a shape-retaining ring for retaining the shape of the nut body.

* * * * *